Patented May 10, 1938

2,116,657

UNITED STATES PATENT OFFICE 2,116,657

MANUFACTURE OF A LOWER ALIPHATIC ANHYDRIDE

Henry Dreyfus, London, England

No Drawing. Application December 4, 1935, Serial No. 52,826. In Great Britain December 7, 1934

11 Claims. (Cl. 260—123)

This invention relates to the manufacture of a lower aliphatic anhydride, and is more particularly concerned with the production of acetic anhydrides.

Thermal decomposition processes have come very much to the fore as technical operations during recent years. These processes involve subjecting an organic compound to high temperatures while controlling the application of the temperature so as to avoid local overheating of the starting material, and while controlling the rate of supply of the starting material so as to avoid the supply of too much heat thereto. In this manner it has been found possible to decompose a number of compounds not completely to their elements but so as to yield a useful product of different composition to the starting material. For instance, acetic acid yields, when subjected to the action of heat without any attempt to control the temperature or quantity of heat supplied, relatively worthless gaseous products such as methane and oxides of carbon. But under the conditions adopted in carrying out thermal decomposition processes it is possible to produce high yields of acetic anhydride and/or of ketene from acetic acid simply by the action of heat. It must be understood therefore that when a technical chemist speaks of subjecting an organic compound to thermal decomposition he understands from that phrase, the employment of that compound as the starting material in a process in which heat is applied under conditions which enable both the quantity and the actual temperature at which the heat is applied to be strictly controlled. It is thus clear that when instructions are given to subject an organic compound to thermal decomposition at a given temperature then, in carrying out these instructions, the compound in question is passed, usually in vapor form, through a zone which is maintained at this temperature by the supply of external heat in such a manner that the time during which the starting material is subjected to this temperature can be adjusted so as to yield the desired product.

It has been discovered that by adopting the principles of thermal decomposition in the manner explained above it is possible to carry out an entirely new reaction, this reaction resulting in the production of lower aliphatic anhydrides from esters of vinyl and like unsaturated alcohols.

According to the present invention acetic or other lower aliphatic anhydride is produced by the thermal decomposition of the vinyl ester of the corresponding acid. Acetic anhydride may thus be produced from vinyl acetate, propionic anhydride from vinyl propionate and butyric anhydride from vinyl butyrate. Instead of vinyl esters allyl esters or other esters of the acids and unsaturated alcohols may be employed.

The temperature employed for the thermal decomposition, which may be carried out under normal, reduced or superatmospheric pressure as desired, may be varied to suit the particular method adopted for effecting the thermal decomposition. Preferably the thermal decomposition is effected by subjecting the vinyl acetate or other ester in the vapour phase to relatively high temperatures, for instance temperatures of about 250 to 550° C. or even higher, e. g. up to about 650° C.

The process may be assisted by catalytic action by the employment of surface catalysts, e. g. pumice, kieselguhr and the like, alone or in conjunction with dehydrating catalysts, for instance acids, e. g. phosphoric acid, and acid salts, e. g. alkali metal hydrogen sulphates, pyrosulphates, hydrogen phosphates and pyrophosphates. It should be noted in this connection that the production of aliphatic anhydrides by the process of the present invention is favourably influenced by the presence of bodies, e. g. tungstic acid, tungstates other than alkali metal tungstates and alkali metal phosphates, capable of catalyzing the thermal decomposition of acetic acid into its anhydride and water.

A very convenient method of effecting the thermal decomposition consists in passing the ester in vapour form through a bath of molten material consisting of or containing a suitable catalyst, such as those indicated above, and heated to a suitable temperature.

The invention is not limited to a process in which the vinyl acetate or other ester is decomposed in the vapour phase and the ester may be decomposed at its boiling point, under the pressure obtaining, by distillation, if desired under a reflux, with a strong dehydrating catalyst, phosphoric acid being particularly useful in this connection.

The vinyl acetate or other ester may be subjected to thermal decomposition while diluted with inert gases or vapors or, where the ester is decomposed while liquid, with inert liquids. It is preferable, however, to carry out the process in the absence of water or water vapour, as the presence of water in the products of the thermal decomposition makes necessary special precautions in the separation of the products to avoid hydrolysis of the acetic or other aliphatic anhydride.

The products of the thermal decomposition may very conveniently be separated by fractional condensation. For instance, when vinyl acetate is decomposed the acetic anhydride produced may be condensed, by one or more stages of cooling, from the lower boiling compounds issuing from the zone, after which the residual vapour may be separated from its various constituents by further stages of cooling.

The products include, besides anhydrides, unsaturated ethers, for instance the thermal decomposition of vinyl acetate produces acetic anhydride and divinyl ether. If, however, the acid whose anhydride is to be produced from the ester is present during the thermal decomposition, an aldehyde (isomeric with the unsaturated alcohol whose ester is decomposed) is produced instead of an ether. Thus by subjecting equimolecular proportions of vinyl acetate and acetic acid to the action of heat, acetic anhydride and acetaldehyde may be produced as the sole or main products. The invention includes such a process in which the thermal decomposition of the ester is effected in presence of the corresponding acid in the free state, whatever the proportions of ester and acid.

The following examples serve to illustrate the invention but it is to be understood that these examples are given solely by way of illustration and are not limitative.

Example 1

Vinyl acetate vapour is passed in a rapid stream through a tube charged with pieces of pumice carrying a deposit of sodium bisulphate and maintained at a temperature of 430–450° C. The vapours issuing from the tube are separated by fractional condensation into fractions consisting mainly of acetic anhydride, divinyl ether and unchanged vinyl acetate.

Example 2

A vaporous mixture consisting of equi-molecular proportions of vinyl acetate and acetic acid are passed in a rapid stream through syrupy phosphoric acid maintained at a temperature of 400–410° C. The vapours leaving the phosphoric acid are separated by fractional condensation into fractions consisting mainly of acetic anhydride, acetaldehyde and unchanged vinyl acetate.

What I claim and desire to secure by Letters Patent is:—

1. Process for the manufacture of a lower aliphatic anhydride, which comprises producing said anhydride by subjecting the vapor of an unsaturated alcohol ester of the corresponding acid to decomposition solely by heat.

2. Process for the manufacture of a lower aliphatic anhydride, which comprises producing said anhydride by subjecting the vapor of the vinyl ester of the corresponding acid to decomposition solely by heat.

3. Process for the manufacture of acetic anhydride, which comprises producing said anhydride by subjecting the vapor of vinyl acetate to decomposition solely by heat.

4. Process for the manufacture of a lower aliphatic anhydride, which comprises producing said anhydride by subjecting the vapor of the vinyl ester of the corresponding acid to thermal decomposition at temperatures of 250–550° C. in the presence of a dehydrating catalyst.

5. Process for the manufacture of acetic anhydride, which comprises producing said anhydride by subjecting the vapor of vinyl acetate to thermal decomposition at temperatures of 250–550° C. in the presence of a dehydrating catalyst.

6. Process for the manufacture of a lower aliphatic anhydride, which comprises producing said anhydride by subjecting to thermal decomposition, in presence of an acid substance selected from the group consisting of phosphoric acid, acid phosphates and acid sulphates, the vapor of the vinyl ester of the corresponding acid.

7. Process for the manufacture of acetic anhydride, which comprises producing said anhydride by subjecting to thermal decomposition, in presence of an acid substance selected from the group consisting of phosphoric acid, acid phosphates and acid sulphates, the vapor of vinyl acetate.

8. Process for the manufacture of a lower aliphatic anhydride, which comprises producing said anhydride by subjecting to thermal decomposition, in presence of an acid substance selected from the group consisting of phosphoric acid, acid phosphates and acid sulphates, the vapor of the vinyl ester of the corresponding acid at temperatures of 250–550° C.

9. Process for the manufacture of acetic anhydride, which comprises producing said anhydride by subjecting to thermal decomposition, in presence of an acid substance selected from the group consisting of phosphoric acid, acid phosphates and acid sulphates, the vapor of vinyl acetate at temperatures of 250–550° C.

10. Process for the manufacture of a lower aliphatic anhydride, which comprises producing said anhydride by subjecting to thermal decomposition, in presence of an acid substance selected from the group consisting of phosphoric acid, acid phosphates and acid sulphates, the vapor of the vinyl ester of the corresponding acid at temperatures of 400–450° C.

11. Process for the manufacture of acetic anhydride, which comprises producing said anhydride by subjecting to thermal decomposition, in presence of an acid substance selected from the group consisting of phosphoric acid, acid phosphates and acid sulphates, the vapor of vinyl acetate at temperatures of 400–450° C.

HENRY DREYFUS.